US012761849B2

(12) United States Patent
Tone

(10) Patent No.: US 12,761,849 B2
(45) Date of Patent: Oct. 13, 2026

(54) CONTROL METHOD OF FOR DISPLAY SYSTEM, DISPLAY DEVICE, AND CONTROL DEVICE

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 2 days.

(21) Appl. No.: 18/904,252

(22) Filed: Oct. 2, 2024

(65) Prior Publication Data

US 2025/0110679 A1 Apr. 3, 2025

(30) Foreign Application Priority Data

Oct. 3, 2023 (JP) ................................ 2023-172066

(51) Int. Cl.
*G06F 3/14* (2006.01)
*H04N 9/31* (2006.01)

(52) U.S. Cl.
CPC ............ *G06F 3/14* (2013.01); *H04N 9/3182* (2013.01)

(58) Field of Classification Search
CPC ................................ G06F 3/14; H04N 9/3182
See application file for complete search history.

(56) References Cited

U.S. PATENT DOCUMENTS

| | | | | |
|---|---|---|---|---|
| 6,493,008 | B1 | 12/2002 | Yui | |
| 2002/0089518 | A1 | 7/2002 | Shigeta | |
| 2013/0235059 | A1* | 9/2013 | Yamamoto | G09G 5/377 345/589 |
| 2014/0359656 | A1* | 12/2014 | Banica | H04N 21/234 725/32 |
| 2018/0277062 | A1 | 9/2018 | Shinozaki | |
| 2023/0141114 | A1* | 5/2023 | Oh | H04N 21/41 345/428 |
| 2024/0244303 | A1* | 7/2024 | Wang | H04N 21/84 |

FOREIGN PATENT DOCUMENTS

| | | | |
|---|---|---|---|
| JP | 2000-305543 | A | 11/2000 |
| JP | 2002-175068 | A | 6/2002 |
| JP | 2008-027196 | A | 2/2008 |
| JP | 2018-163234 | A | 10/2018 |

* cited by examiner

*Primary Examiner* — Kyu Chae
(74) *Attorney, Agent, or Firm* — Oliff PLC

(57) ABSTRACT

A control device transmits output information containing an output image in which a first APP image is placed and position information indicating a position of an image to be placed in a third window to a projector, an image supply device transmits image data to the projector, the projector generates a display image by placing an image based on the image data based on the position information in the output image and displays the generated display image on a projection surface.

8 Claims, 9 Drawing Sheets

CONTROL METHOD OF FOR DISPLAY SYSTEM, DISPLAY DEVICE, AND CONTROL DEVICE

The present application is based on, and claims priority from JP Application Serial Number 2023-172066, filed Oct. 3, 2023, the disclosure of which is hereby incorporated by reference herein in its entirety.

BACKGROUND

1. Technical Field

The present disclosure relates to a control method for a display system, a display device, and a control device.

2. Related Art

In related art, a system that displays images supplied from a plurality of image sources on one screen is known.

For example, JP-A-2000-305543 discloses a multi-image display system that simultaneously displays a plurality of images by one display device, and includes a display area determination means and a cursor control means. The display area determination means of JP-A-2000-305543 determines a display area in which a multi-screen control cursor is located on a multi-screen on which a plurality of images are simultaneously displayed. The cursor control means sets a function of the multi-screen control cursor in a display area according to a type of an image source of the images displayed in the display area where the multi-screen control cursor is located, and performs control related to the multi-screen control cursor and the operation thereof for fulfilling the set function.

JP-A-2000-305543 is an example of the related art.

When a display device is provided with a function of adjusting a layout of a plurality of images, load on the display device increases, and it is necessary to increase processing power of the display device or to sophisticate the function of the display device. Accordingly, there is a demand to increase the degree of freedom in arrangement of a plurality of images without increase of the processing power of the display device.

SUMMARY

A control method for a display system according to an aspect of the present disclosure includes transmitting output information containing an output image in which a first image is placed and position information indicating a position of the output image in which a second image is to be placed to a display device by a control device, transmitting the second image to the display device by an image supply device, generating a display image by placing the second image in the output image based on the position information by the display device, and displaying the display image by the display device.

A display device according to an aspect of the present disclosure includes a first interface coupled to a control device, a second interface coupled to an image supply device, an optical device, and at least one processor, wherein the at least one processor executes receiving output information containing an output image in which a first image is placed and position information indicating a position of the output image in which a second image is to be placed via the first interface, receiving the second image via the second interface, generating display image by placing the second image in the output image based on the position information, and displaying the display image using the optical device.

A control device according to an aspect of the present disclosure includes at least one processor, wherein the at least one processor executes generating output information containing an output image in which a first image is placed and position information indicating a position of the output image in which a second image is to be placed, and transmitting the output information to a display device.

DESCRIPTION OF EMBODIMENTS

As below, embodiments of the present disclosure will be described with reference to the drawings.

1. System Configuration of Embodiment

Figure 1:
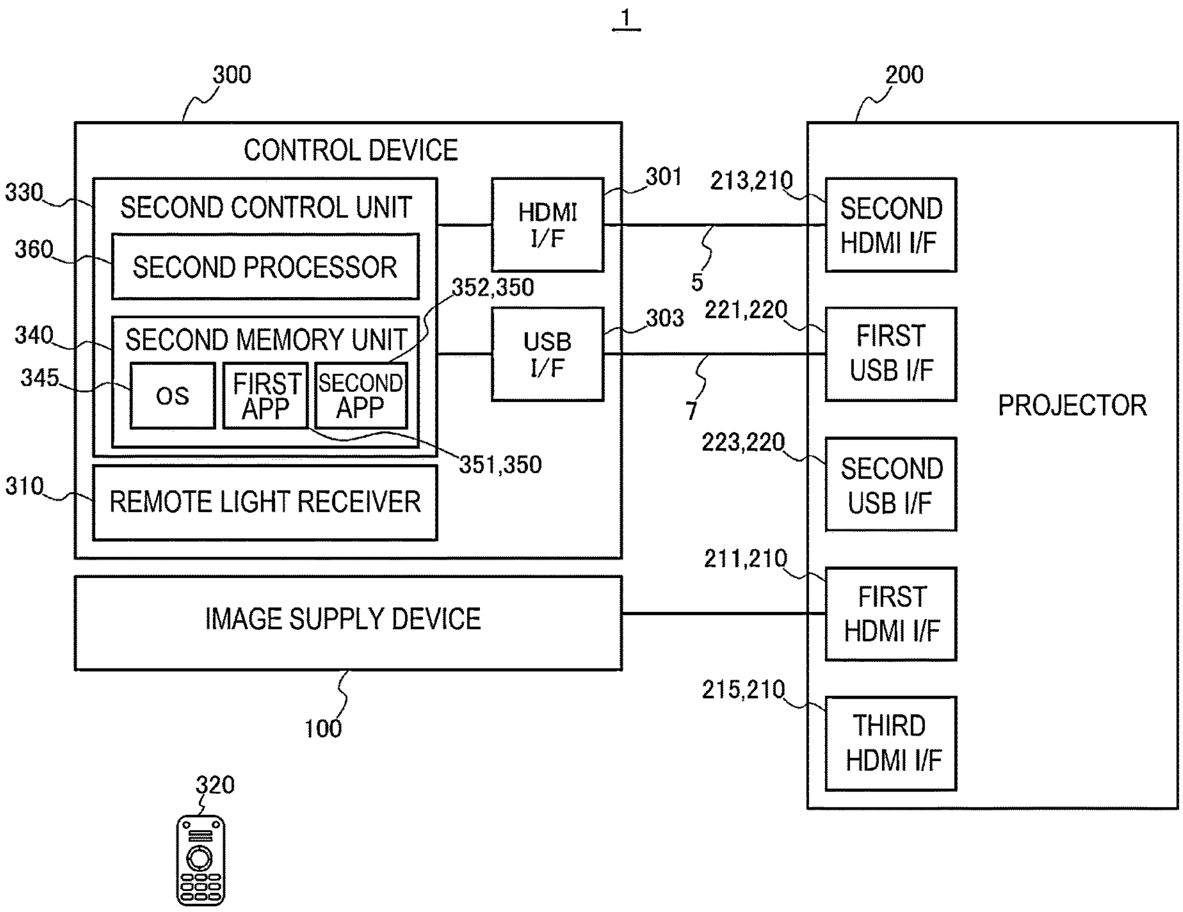
FIG. 1 shows a system configuration of a display system.

FIG. 1 shows a system configuration of a display system 1.

The display system 1 has an image supply device 100, a projector 200, and a control device 300.

While FIG. 1 shows a configuration where one image supply device 100 is coupled to the projector 200, the number of image supply devices 100 coupled to the projector 200 is not limited to one, and two or more image supply devices 100 may be coupled.

The image supply device 100 is a device that supplies image data to the projector 200. As the image supply device 100, for example, a laptop or desktop personal computer, or a smart device such as a smartphone, a smart stick or a tablet terminal can be used. As the image supply device 100, a recorder such as a DVD (Digital Versatile Disc), a BD (Blu-ray Disc) or an HDD (hard disk drive), or various STBs (Set Top Boxes) may be used. Blu-ray is a registered trademark.

The projector 200 is a device that displays a display image on a projection surface 30. As the projection surface 30, for example, a screen or an indoor wall surface is used.

The projector 200 has a plurality of image interfaces used to communicate image data, and a plurality of data interfaces used to communicate image data and control data. Hereinafter, an interface is also referred to as an I/F. In this embodiment, a case where the projector 200 has HDMI I/Fs 210 as the image I/Fs and USB I/Fs 220 as the data I/Fs is described. The image I/F of the projector 200 may be, for example, a display port, and the data I/F of the projector 200 may be, for example, Ethernet. HDMI and Ethernet are registered trademarks. The HDMI I/F 210 and the USB I/F 220 provided in the projector 200 are collectively referred to as an input I/F.

FIG. 1 shows the projector 200 having a first HDMI I/F 211, a second HDMI I/F 213, and a third HDMI I/F 215 as the HDMI I/Fs 210.

Further, FIG. 1 shows the projector 200 having a first USB I/F 221 and a second USB I/F 223, as the USB I/Fs 220.

In the embodiment, a case where the image supply device 100 is coupled to the first HDMI I/F 211 and the control device 300 is coupled to the second HDMI I/F 213 is described. Further, in the embodiment, a case where the control device 300 is coupled to the first USB I/F 221 is described. The first HDMI I/F 211 corresponds to a second interface.

The control device 300 generates output information as information controlling the projector 200 to display a display image 500C, and transmits the generated output information to the projector 200. The output information includes an output image 500B in which a plurality of windows are arranged. In the plurality of windows, for example, images displayed by an application program installed in the control device 300, images of moving image files reproduced by the control device 300, and the like are displayed. Hereinafter, the application program is abbreviated as APP. The projector 200 generates the display image 500C based on the output information received from the control device 300, and displays the generated display image 500C on the projection surface 30.

The control device 300 includes an HDMI I/F 301 as an image I/F and a USB I/F 303 as a data I/F. The image I/F of the control device 300 may be, for example, a display port, and the data I/F of the projector 200 may be, for example, Ethernet.

In the embodiment, the HDMI I/F 301 is coupled to the second HDMI I/F 213 of the projector 200 via a cable 5, and the USB I/F 303 is coupled to the first USB I/F 221 of the projector 200 via a cable 7. The HDMI I/F 301 or the USB I/F 303 of the control device 300 and the second HDMI I/F 213 or the first USB I/F 221 of the projector 200 correspond to a first interface.

When the HDMI I/F 301 has a male connector and the second HDMI I/F 213 has a female connector, the male connector of the HDMI I/F 301 may be directly coupled to the female connector of the second HDMI I/F 213.

2. Configuration of Projector

Figure 2:
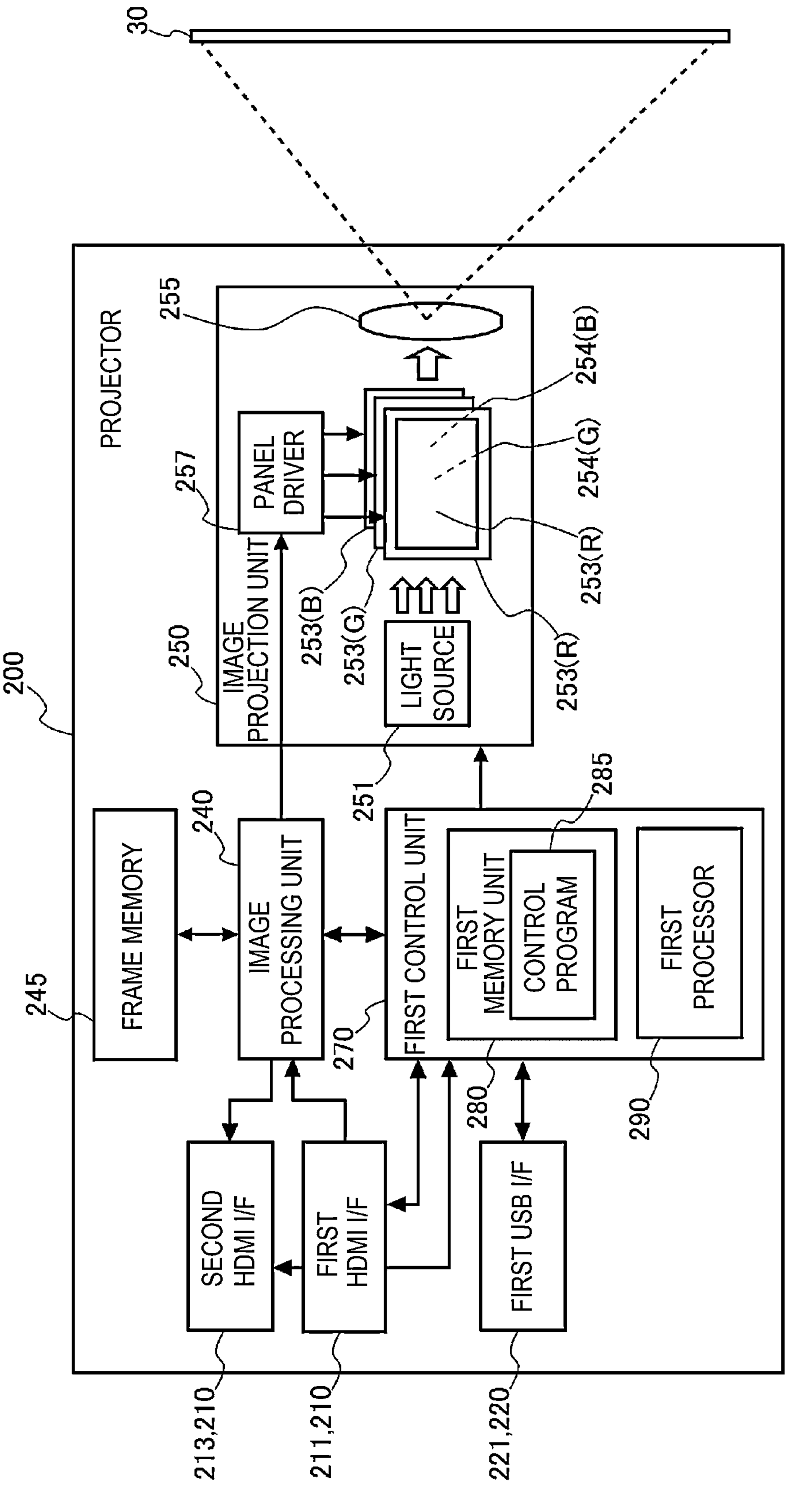
FIG. 2 is a block diagram showing a configuration of a projector.

FIG. 2 is a block diagram showing a configuration of the projector 200.

Next, the configuration of the projector 200 will be described with reference to FIG. 2.

In FIG. 2, for simplification of illustration, the first HDMI I/F 211 and the second HDMI I/F 213 are shown as image I/Fs, the first USB I/F 221 is shown as a data I/F, and the other HDMI I/Fs 210 and USB I/Fs 220 are not shown.

The projector 200 includes the HDMI I/F 210, the USB I/F 220, an image processor 240, a frame memory 245, an image projector 250, and a first controller 270.

Each of the first HDMI I/F 211, the second HDMI I/F 213, and the third HDMI I/F 215 includes a coupling port and an interface circuit conforming to the HDMI standard.

Each of the first USB I/F 221 and the second USB I/F 223 includes a coupling port and an interface circuit conforming to the USB standard.

The frame memory 245 is coupled to the image processor 240. The image processor 240 loads an image based on the image data received by the HDMI I/F 210 or the USB I/F 220 in the frame memory 245. The image processor 240 performs image processing such as resolution conversion or resizing, distortion aberration correction, shape correction, digital zoom, and adjustment of the color tone and brightness of the image on the image loaded in the frame memory 245. The image processor 240 outputs image information as information of the image loaded in the frame memory 245 to a panel driver 257 of the image projector 250.

The frame memory 245 and the image processor 240 are formed by, for example, an integrated circuit. The integrated circuit includes an LSI (Large Scale Integrated Circuit), an ASIC (Application Specific Integrated Circuit), a PLD (Programmable Logic Device), an FPGA (Field-Programmable Gate Array), an SoC (System-on-a-chip), and the like. The frame memory 245 and the image processor 240 may include an analog circuit in a part of the configuration of the integrated circuit or may be configured with a combination of the first controller 270 and an integrated circuit.

The image projector 250 has a light source 251, a light modulation device, and the panel driver 257. The light modulation device has three liquid crystal panels 253(R), 253(G), 253(B), and a projection lens 255 as an optical system unit.

The light source 251 includes a solid-state light source such as a light emitting diode or a semiconductor laser. A discharge light source lamp such as an ultra-high-pressure mercury lamp or a metal halide lamp may be used for the light source 251. The light source 251 emits a light to be an image light under control of the first controller 270. The light emitted from the light source 251 is converted to a light having a substantially uniform luminance distribution by an optical integration system (not shown) and separated into color light components of red (R), green (G), and blue (B) as the three primary colors of light by a color separation system (not shown). Subsequently, the lights separated into the respective color light components of red (R), green (G), and blue (B) enter the liquid crystal panels 253(R), 253(G), 253(B), respectively. The lights separated into the respective color light components entering the liquid crystal panels 253(R), 253(G), 253(B) are referred to color lights.

Each of the liquid crystal panels 253(R), 253(G), 253(B) includes a transmissive liquid crystal panel with a liquid crystal enclosed between a pair of transparent substrates. In the liquid crystal panels 253(R), 253(G), 253(B), rectangular image formation areas 254(R), 254(G), 254(B) each including a plurality of pixels arranged in a matrix form are formed, respectively, and a drive voltage can be applied to each pixel. The projector 200 uses the liquid crystal panels 253 (R), 253 (G), and 253 (B), but is not limited thereto. A reflective liquid crystal panel or an LCOS (liquid crystal on silicon) panel may be provided. Or, the projector 200 may include one or more DMDs (digital mirror devices).

The panel driver 257 forms images in the image formation areas 254(R), 254(G), 254(B) in the liquid crystal panels 253(R), 253(G), 253(B). Specifically, the panel driver 257 applies a drive voltage corresponding to the image information input from the image processor 240 to each pixel of the image formation areas 254(R), 254(G), 254(B) according to an instruction from the first controller 270. Thereby, each pixel in the image formation areas 254(R), 254(G), 254(B) is set to light transmittance according to the image information. The light emitted from the light source 251 is transmitted through the image formation areas 254(R), 254 (G), 254(B) in the liquid crystal panels 253(R), 253(G), 253(B) and modulated with respect to each pixel, and an image light according to the image information is formed with respect to each color light. Thus formed image lights of the respective colors are combined with respect to each pixel by a light combining system (not shown) to form an image light representing a color image and enlarged and projected on the projection surface 30 by the projection lens 255.

The first controller 270 has a first memory 280 and a first processor 290.

The first memory 280 includes at least a nonvolatile memory device. The first memory 280 may additionally include a volatile memory device. The nonvolatile memory device includes, for example, a ROM (Read Only Memory), a flash memory, an EEPROM (Electrically Erasable Programmable Read-Only Memory).

The first memory 280 is used as a calculation area of the first processor 290. The first memory 280 stores a control program 285 executed by the first processor 290, setting data relating to operation of the projector 200, and the like.

The first processor 290 is an arithmetic processing device having a processor such as a CPU (Central Processing Unit) or an MPU (Micro-Processing Unit). The first processor 290 can be formed using a single processor or a plurality of processors. The first processor 290 may include a part or all of the first memory 280 or an SoC (System-on-a-Chip) integrated with another circuit. The first processor 290 may include a combination of a CPU executing a program and a DSP (Digital Signal Processor) executing predetermined arithmetic processing. Further, all of the functions of the first processor 290 may be implemented in hardware or the first processor may be configured using a programmable device.

3. Configuration of Control Device

Returning to FIG. 1, a configuration of the control device 300 will be described.

The control device 300 has the HDMI I/F 301, the USB I/F 303, a remote light receiver 310, and a second controller 330.

The HDMI I/F 301 includes a coupling port and an interface circuit conforming to the HDMI standard.

The USB I/F 303 has a coupling port and an interface circuit conforming to the USB standard.

The remote light receiver 310 is a receiver for an infrared signal, and includes a light receiving element, a decoder, and the like (not shown). The remote light receiver 310 receives and decodes an infrared signal transmitted from a remote 320. The remote light receiver 310 decodes the infrared signal and outputs an instruction signal corresponding to an operated operation key or button of the remote 320 to the second controller 330. The remote light receiver 310 may be configured to receive a radio signal of Bluetooth or the like from the remote 320. When receiving a radio signal, the remote light receiver 310 may include an antenna and a reception circuit. Bluetooth is a registered trademark.

The remote 320 has, for example, a screen split button, arrow keys corresponding to the respective upward, downward, leftward, and rightward directions, an undo button to undo an accepted operation, an enlarge button, a reduce button, and an enter button to finalize an accepted operation, and the like. The screen split button is a button for the projector 200 to display the display image having a plurality of windows.

While an example where the dedicated remote 320 to operate the control device 300 is provided is described in the embodiment, the remote 320 may be a portable terminal such as a smartphone. In this case, an operation key and the like are displayed on a touch panel of the portable terminal by application software installed in the portable terminal.

The second controller 330 includes a second memory 340 and a second processor 360.

The second memory 340 has at least a nonvolatile memory device. The second memory 340 may additionally include a volatile memory device. The nonvolatile memory device includes, for example, a ROM, a flash memory, and an EEPROM.

The second memory 340 is used as a calculation area of the second processor 360. The second memory 340 stores an OS (operating system) 341 and an APP 350 executed by the second processor 360. In the embodiment, a case where the second memory 340 stores two APPs of a first APP 351 and a second APP 353 as the APPs 350 will be described. In addition, the second memory 340 may store a moving image file or a still image file.

The second processor 360 is an arithmetic processing device having a processor such as a CPU or an MPU. The second processor 360 may include a single processor or a plurality of processors. The second processor 360 may include a part or all of the second memory 340 or an SoC integrated with another circuit. The second processor 360 may include a combination of a CPU executing a program and a DSP executing predetermined arithmetic processing. Further, all of the functions of the second processor 360 may be implemented in hardware or the second processor 360 may be configured using a programmable device.

4. Operation of Display System

Next, an operation of the display system 1 will be described.

The display system 1 is a system that displays an image supplied to the projector 200 by the image supply device 100 and the control device 300 in multi-window display. An image displayed on the projection surface 30 by the projector 200 is referred to as the display image 500C. The display image 500C contains a plurality of windows 600. As below, a case where the display image 500C contains three windows 600 of a first window 610, a second window 630, and a third window 650 will be described, however, the display image 500C contains an arbitrary number of windows 600.

The first window 610, the second window 630, and the third window 650 display images based on image data supplied from the APP 350 installed in the control device 300 and the image supply device 100.

For the projector 200 to display the display image 500C, the image supply device 100 transmits image data to the projector 200 and the control device 300 transmits output information to the projector 200.

For explanation of the output information, an operation of the control device 300 will be described.

When a user presses a screen split button of the remote 320, an operation signal indicating that the screen split button is operated is input from the remote light receiver 310 to the second controller 330.

Figure 3:
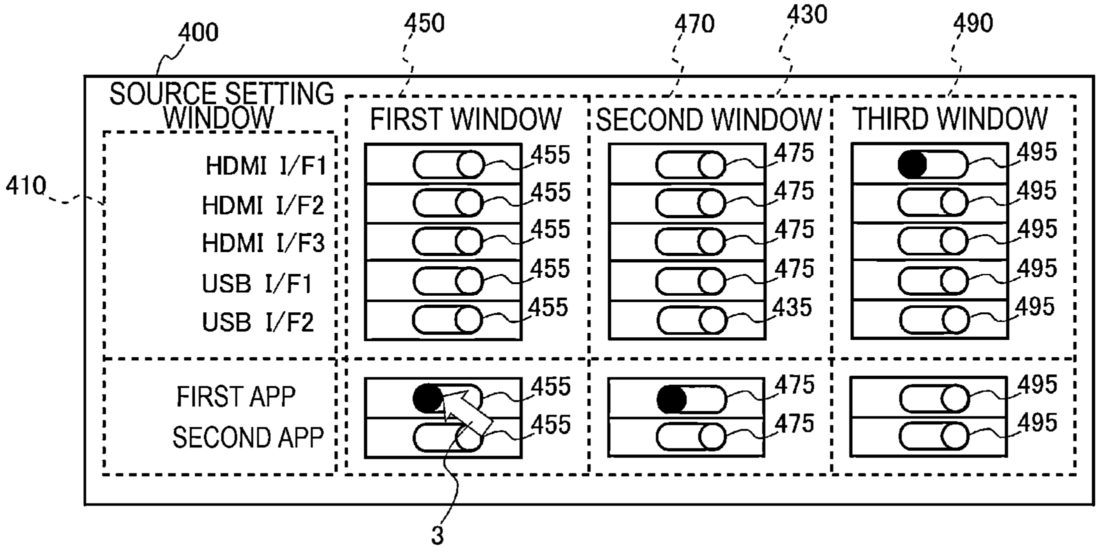
FIG. 3 shows a source setting window.

When the operation signal of the screen split button is input, the second controller 330 transmits the image data of a source setting window 400 shown in FIG. 3 to the projector 200. The projector 200 generates an image light based on the input image data and projects the generated image light on the projection surface 30.

FIG. 3 shows the source setting window 400 displayed on the projection surface 30.

The source setting window 400 includes a source list 410 and a setting field 430. A cursor 3 is displayed in the source setting window 400. The cursor 3 can change a display position in the source setting window 400 by operating the arrow keys of the remote 320.

The source list 410 shows a list of sources. In the source list 410, the HDMI I/F 210 and the USB I/F 220 provided in the projector 200 and the APP 350 installed in the control device 300 are displayed as sources.

The setting field 430 is a field for setting sources to be displayed by the projector 200 of a plurality of sources displayed in the source list 410. The setting field 430 includes a first window setting field 450, a second window setting field 470, and a third window setting field 490. In the first window setting field 450, a toggle button 455 is displayed for each source shown in the source list 410, and in the second window setting field 470, a toggle button 475 is displayed for each source shown in the source list 410. In the third window setting field 490, a toggle button 495 is displayed for each source displayed in the source list 410.

The user operates the arrow keys on the remote 320 to move the cursor 3 to the display position of the toggle button 455 corresponding to the source to be displayed in the first window 610, and then, presses the enter button on the remote 320. Thereby, the state of the toggle button 455 with the cursor 3 superimposed thereon is changed from OFF to ON. The user operates the remote 320 to similarly set with respect to the second window 630 and the third window 650.

In the following description, it is assumed that the first APP 351 is set as a source in the first window setting field 450 and the second APP 353 is set as a source in the second window setting field 470. In the third window setting field 490, it is assumed that the first HDMI I/F 211 is set as a source.

Then, the user presses the enter button provided on the remote 320. When the enter button is pressed, the second controller 330 accepts the setting of the source setting window 400.

Then, the second controller 330 starts the first APP 351 and the second APP 353 set in the source setting window 400, and generates image data of an adjustment image 500A containing the first window 610, the second window 630, and the third window 650. The second controller 330 transmits the generated image data of the adjustment image 500A to the projector 200 and controls the projector 200 to display the adjustment image 500A.

Figure 4:
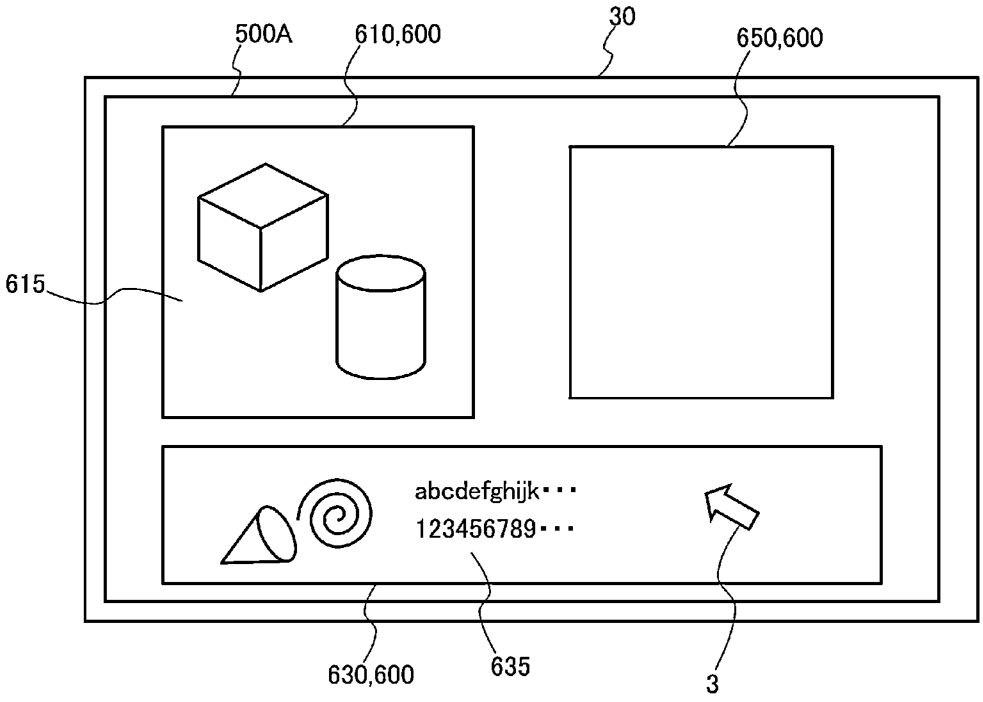
FIG. 4 shows an adjustment image.

FIG. 4 shows the adjustment image 500A.

The adjustment image 500A contains the first window 610, the second window 630, and the third window 650. When controlling the projector 200 to initially display the adjustment image 500A after the user sets the source setting window 400, the second controller 330 displays the first window 610, the second window 630, and the third window 650 in default display size and display position.

A first APP image 615 as an image displayed by the first APP 351 is displayed in the first window 610, and a second APP image 635 as an image displayed by the second APP 353 is displayed in the second window 630. The third window 650 displays an image of a frame indicating the range of the third window 650. The first APP image 615 and the second APP image 635 correspond to a first image.

The user can change the display positions or the display sizes of the first window 610, the second window 630, and the third window 650 in the adjustment image 500A by operating the remote 320.

First, the user operates the arrow keys of the remote 320 to change the display position of the cursor 3 to be superimposed on the window 600 whose display position or display size is desired to be changed. When the cursor 3 is superimposed on the window 600 whose display position or display size is desired to be changed, the user presses the enter button.

Figure 5:
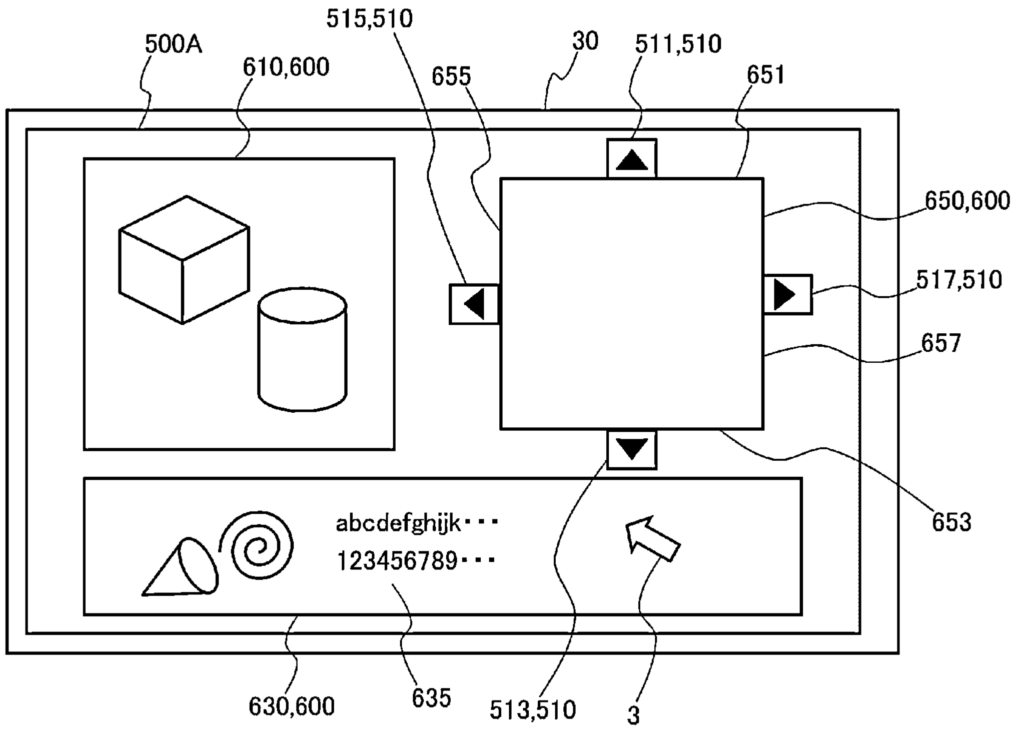
FIG. 5 shows a state in which arrow images are displayed in a selected window.

FIG. 5 shows a state in which arrow images 510 are displayed in the window 600 whose display position or display size is to be changed.

When the enter button of the remote 320 is short-pressed, the second controller 330 displays the arrow images 510 around the window 600 with the cursor 3 superimposed thereon. FIG. 5 shows an arrow image 511 indicating an upward direction displayed on an upper side 651 of the third window 650 and an arrow image 513 indicating a downward direction displayed on a lower side 653 in the drawing. Further, FIG. 5 shows an arrow image 515 indicating a left direction displayed on a left side 655 and an arrow image 517 indicating an upper direction displayed on a right side 657 in the drawing.

Then, the user presses the arrow key of the direction in which the third window 650 is desired to be moved. While the arrow key is pressed, the second controller 330 moves the third window 650 in the direction of the pressed arrow key.

After moving the third window 650 to the position in the adjustment image 500A where the third window 650 is desired to be displayed, the user presses the enter button provided on the remote 320. When the enter button on the remote 320 is pressed, the second controller 330 finalizes the display position of the third window 650.

Further, when enlarging or reducing the display size of the third window 650, the user operates the arrow keys on the remote 320 to superimpose the cursor 3 on the window 600 whose display position or display size is desired to be changed, and then, presses the enter button. When changing the display size of the window 600, the user may press the enter button twice consecutively or may long-press the enter button. In the embodiment, it is assumed that when the user performs an operation to long-press the enter button, the second controller 330 is enabled to accept an operation of the enlarge button or the reduce button provided on the remote 320. Under the condition, the user presses the enlarge button or the reduce button provided on the remote 320. While the enlarge button or the reduce button is pressed, the second controller 330 enlarges or reduces the display size of the window 600 with the cursor 3 superimposed thereon.

When the adjustment of the display position or the display size of the window 600 in the adjustment image 500A is completed, the user moves the cursor 3 to a position not superimposed on the window 600, and presses the enter button on the remote 320.

When the enter button of the remote 320 is pressed with the cursor 3 not superimposed on the window 600, the second controller 330 determines that the processing in the adjustment image 500A is ended. Then, the second controller 330 generates output information to be output to the projector 200.

Figure 6:
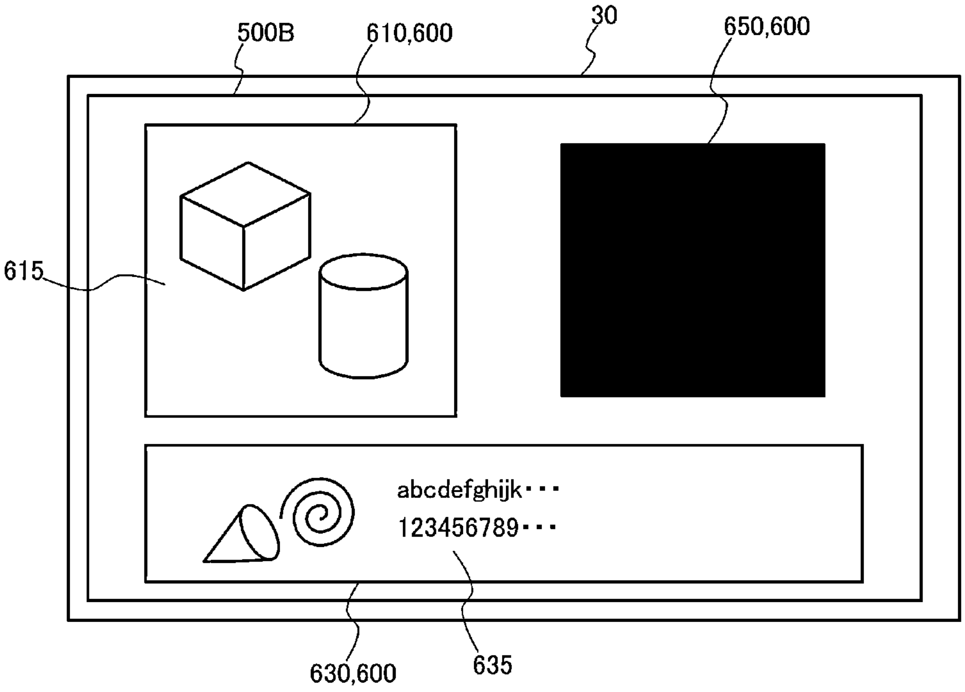
FIG. 6 shows an output image in which a display color of a third window is changed to black.

FIG. 6 shows the output image 500B in which the display color of the third window 650 is changed to black.

The second controller 330 changes the display color of the third window 650 to a color different from the display color of the other area than the area in which the window 600 of the adjustment image 500A is displayed. Specifically, the third window 650 is a window 600 in which an image supplied by the image supply device 100 is displayed. The other area than the area in which the window 600 is displayed is hereinafter referred to as a background area. For example, when the display color of the background area is white, the display color of the third window 650 is changed to black. The third window 650 corresponds to an area in which the second image is placed. An image in which the display color of the window 600 for displaying the image supplied by the image supply device 100 is changed to black is referred to as the output image 500B. Black is a first color and corresponds to a preset color.

The second controller 330 may generate the adjustment image 500A and information indicating the position and the size of the window 600 for displaying the image supplied by the image supply device 100 in the adjustment image 500A as the output information. The information indicating the position and the size is referred to as window information. The window information corresponds to position information. The information indicating the position is, for example, information indicating coordinates of the upper left and lower right of the window 600 for displaying the image supplied by the image supply device 100, where the upper left of the adjustment image 500A shown in FIG. 4 is the origin, the horizontal direction is an X-axis, and the vertical direction is a Y-axis in the drawing. The information indicating the size is, for example, information indicating resolution in the vertical direction and the horizontal direction of the window 600 for displaying the image supplied by the image supply device 100. When the information indicating the position and the size is generated as the output information, the display color of the window 600 of the output image 500B may be another color than black. For example, the display color of the window 600 may be blue. The display color of the window 600 may be white when the display color of the background area is white.

After generating the output image 500B, the second controller 330 transmits the generated output image 500B and source information indicating the source of the image to be displayed in the third window 650 to the projector 200 as the output information. In the embodiment, the source information indicating the source is information indicating the first HDMI I/F 211. The second controller 330 transmits the output information to the projector 200 via the USB I/F 303. The second controller 330 may transmit the output image 500B to the projector 200 via the HDMI I/F 301 and transmit the source information to the projector 200 via the USB I/F 303.

After generating the adjustment image 500A and the window information, the second controller 330 transmits the information and the source information indicating the source of the image to be displayed in the third window 650 to the projector 200 as the output information. The second controller 330 transmits the output information to the projector 200 via the USB I/F 303. The second controller 330 may transmit the adjustment image 500A to the projector 200 via the HDMI I/F 301 and transmit the window information and the source information to the projector 200 via the USB I/F 303.

When receiving the output image 500B and the source information as the output information, the first controller 270 detects an area of the black window 600 contained in the output image 500B. Specifically, the first controller 270 detects the area of the black window 600 by detecting pixels having a predetermined pixel value among the respective pixels of the output image 500B. The pixel value of the black window 600 is, for example, (R, G, B)=(0, 0, 0). When a predetermined number or more of pixels of (R, G, B)=(0, 0, 0) in the output image 500B are continuously arranged in both the vertical direction and the horizontal direction of the output image 500B, the first controller 270 determines that the area is the area of the black window 600. The predetermined number is, for example, 100. The predetermined number is not limited to 100, but the area may have any size that can display image data, which will be described later. The first controller 270 sets a minimum rectangle containing all the pixels of the detected black window 600 and, for example, regards the coordinates in the viewpoint of the rectangle as the position of the area of the detected black window 600. The first controller 270 sets the numbers of pixels in the vertical direction and the horizontal direction of the rectangle as the resolution of the detected area of the black window 600. When the information indicating the position and the size is received as output information, the information indicating the position and the size is used for subsequent processing. When the information indicating the position and the size is received, the processing of detecting the area of the black window 600 is not necessarily performed.

The first controller 270 compares the resolution of the detected area of the black window 600 with the resolution of the image data input to the first HDMI I/F 211 indicated by the source information. When the resolution of the image data input to the HDMI I/F 211 and the resolution of the detected area of the black window 600 are different, the first controller 270 executes resolution conversion processing of converting the resolution of the image data input to the first HDMI I/F 211. The first controller 270 executes the resolution conversion processing of the image data input to the first HDMI I/F 211 so that the resolution of the image data input to the first HDMI I/F 211 is the same as the resolution of the area of the black window 600. The image data input to the first HDMI I/F 211 corresponds to a second image.

When receiving the adjustment image 500A, the window information, and the source information, the first controller 270 compares the resolution in the vertical direction and the horizontal direction of the window 600 indicated by the window information with the resolution of the image data input to the first HDMI I/F 211 indicated by the source information. When the resolution of the image data input to the first HDMI I/F 211 and the degrees of resolution in the vertical direction and the horizontal direction of the window 600 indicated by the window information are different, the first controller 270 executes the resolution conversion processing of converting the resolution of the image data input to the first HDMI I/F 211. The first controller 270 executes the resolution conversion processing of the image data input to the first HDMI I/F 211 so that the resolution of the image data input to the first HDMI I/F 211 is the same as the resolution of the window 600 indicated by the window information in the vertical direction and the horizontal direction.

Then, the first controller 270 outputs the image data subjected to the resolution conversion processing and the output image 500B to the image processor 240.

Figure 7:
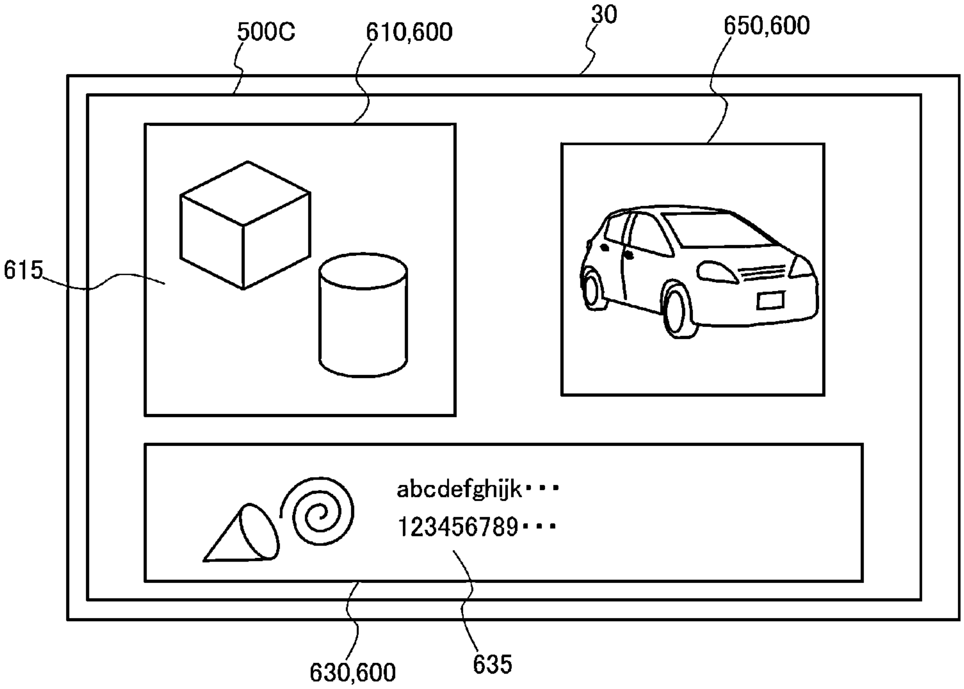
FIG. 7 shows a display image displayed on a projection surface by the projector.

The image processor 240 loads the output image 500B input from the first controller 270 in the frame memory 245, and superimposes the input image data on the black window 600 of the loaded output image 500B. FIG. 7 shows the display image 500C in which the input image data is superimposed on the black window 600 of the output image 500B.

The first controller 270 outputs the image data subjected to the resolution conversion processing, the adjustment image 500A, and the window information to the image processor 240.

The first controller 270 loads the adjustment image 500A input from the first controller 270 in the frame memory 245.

The first controller 270 superimposes the input image data on the position of the adjustment image 500A indicated by the window information.

Then, the image processor 240 reads image information as information of the image loaded in the frame memory 245, and outputs the information to the image projector 250. The image information is input to the panel driver 257 of the image projector 250.

The panel driver 257 applies a drive voltage corresponding to the image information input from the image processor 240 to each pixel of the image formation areas 254 (R), 254 (G), and 254 (B). The light emitted from the light source 251 is transmitted through the image formation areas 254 (R), 254 (G), and 254 (B) of the liquid crystal panels 253 (R), 253 (G), and 253 (B) to generate an image light, and the generated image light is projected on the projection surface 30 by the projection lens 255. Thereby, the display image 500C shown in FIG. 7 is displayed on the projection surface 30.

Figure 8:
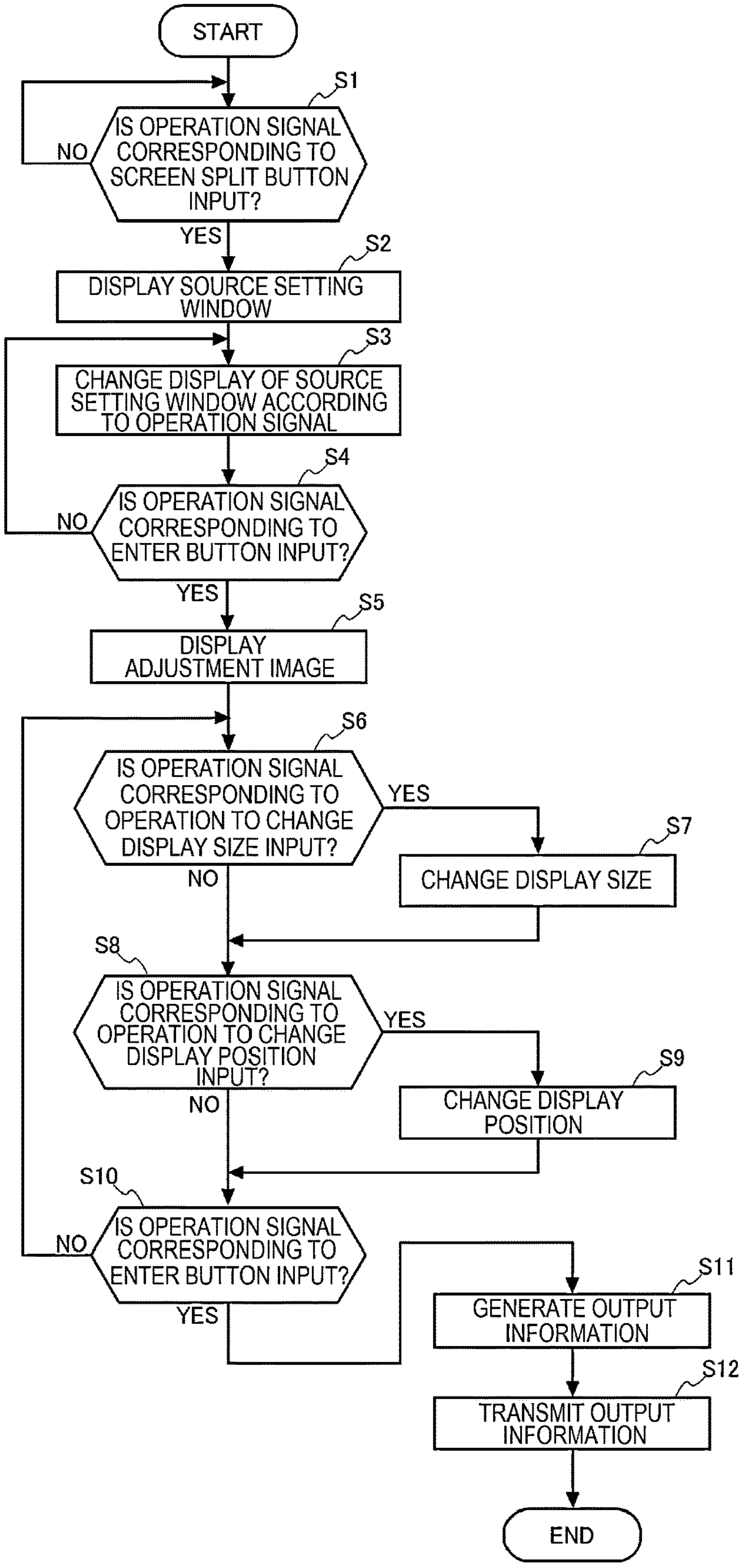
FIG. 8 is a flowchart showing an operation of a control device.

FIG. 8 is a flowchart showing the operation of the control device 300.

The operation of the control device 300 will be described with reference to the flowchart shown in FIG. 8.

First, the second controller 330 determines whether an operation signal corresponding to the screen split button is input (step S1). The operation signal corresponding to the screen split button is a signal output by the remote light receiver 310 to the second controller 330 when the screen split button is pressed. When the operation signal corresponding to the screen split button is not input (step S1/NO), the second controller 330 waits until the operation signal is input.

When the operation signal of the screen split button is input (step S1/YES), the second controller 330 transmits the image data of the source setting window 400 to the projector 200 and controls the projector 200 to display the source setting window 400 on the projection surface 30 (step S2).

Then, the second controller 330 changes the display of the source setting window 400 according to the operation signal input from the remote light receiver 310 (step S3), and determines whether the operation signal corresponding to the enter button is input (step S4). The operation signal corresponding to the enter button is a signal output by the remote light receiver 310 to the second controller 330 when the enter button is pressed.

When the operation signal corresponding to the enter button is not input (step S4/NO), the second controller 330 returns to the processing at step S4. When the operation signal corresponding to the enter button is input (step S4/YES), the second controller 330 accepts the setting of the source setting window 400 and transmits the image data of the adjustment image 500A to the projector 200. Then, the second controller 330 controls the projector 200 to display the adjustment image 500A on the projection surface 30 (step S5).

Then, the second controller 330 determines whether an operation signal corresponding to an operation to change the display sizes of the plurality of windows 600 displayed in the adjustment image 500A is input (step S6).

For example, when an operation signal indicating that the enter button is long-pressed is input with the cursor 3 superimposed on the window 600, the second controller 330 determines that the operation signal corresponding to the operation to change the display size is input (step S6/YES).

While an operation signal of the enlarge button is input, the second controller 330 changes the display size of the window 600 with the cursor 3 superimposed thereon by a preset setting value (step S7), and enlarges the display size of the window 600. Further, while an operation signal of the reduce button is input, the second controller 330 changes the display size of the window 600 with the cursor 3 superimposed thereon by the preset setting value (step S7), and reduces the display size of the window 600.

When the operation signal corresponding to the operation to change the display size is not input (step S6/NO), the second controller 330 determines whether an operation signal corresponding to the operation to change the display position of the window 600 is input (step S8).

For example, when an operation signal indicating that the enter button is short-pressed is input with the cursor 3 superimposed on the window 600, the second controller 330 determines that the operation to change the display position is input (step S8/YES).

The second controller 330 displays the arrow image 510 shown in FIG. 5 around the window 600 whose display position is to be changed. When an operation signal indicating that the arrow key is operated is input, the second controller 330 changes the display position of the target window 600 (step S9). The second controller 330 moves the display position of the window 600 in the direction corresponding to the operated arrow key.

When the operation signal corresponding to the operation to change the display size is not input (step S8/NO), the second controller 330 determines whether an operation signal corresponding to the enter button is input (step S10). The operation signal corresponding to the enter button is a signal output by the remote light receiver 310 to the second controller 330 when the enter button is pressed.

When the operation signal corresponding to the enter button is not input (step S10/NO), the second controller 330 returns to the determination at step S6.

When the operation signal corresponding to the enter button is input (step S10/YES), the second controller 330 generates output information (step S11). The output information contains the output image 500B and the source information. The second controller 330 generates the output image 500B in which the display color of the window 600 for displaying the image of the image data input to the input I/F of the projector 200 is s changed to black. The source information is set based on the setting of the source accepted in the source setting window 400.

Then, the second controller 330 transmits the generated output information to the projector 200 via the USB I/F 303 (step S12). The second controller 330 may transmit the output image 500B to the projector 200 via the HDMI I/F 301 and transmit the source information to the projector 200 via the USB I/F 303.

Figure 9:
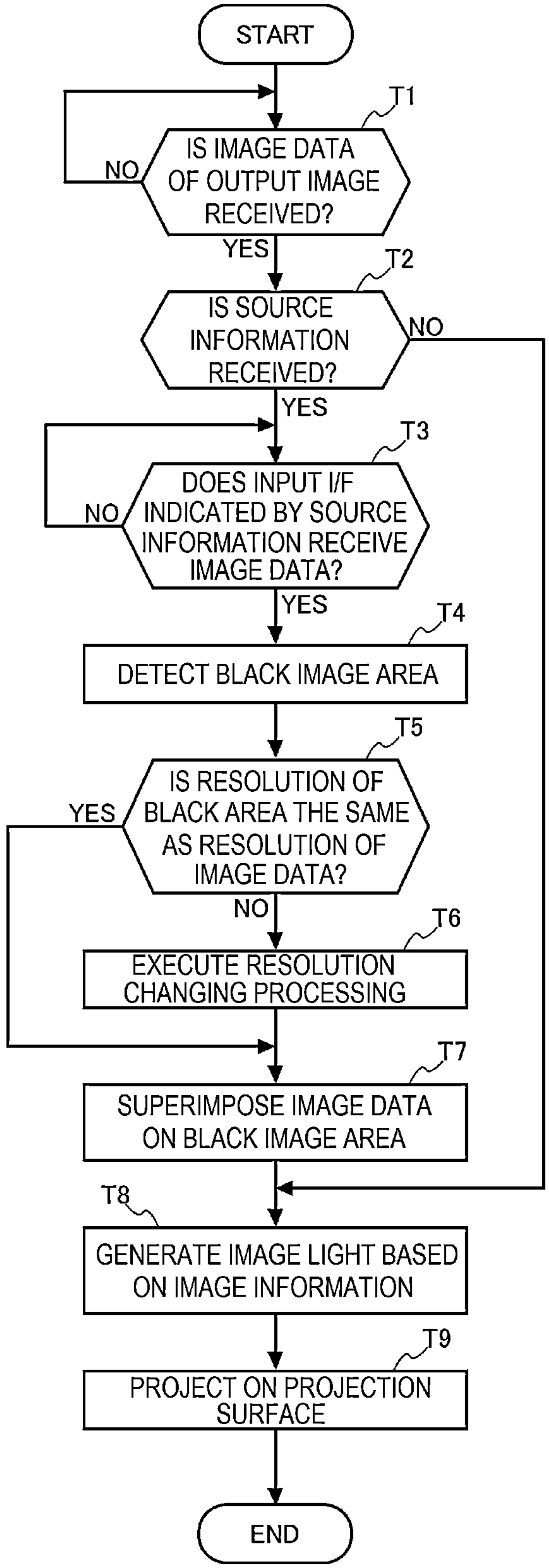
FIG. 9 is a flowchart showing an operation of the projector.

FIG. 9 is a flowchart showing an operation of the projector 200.

The operation of the projector 200 will be described with reference to the flowchart shown in FIG. 9.

First, the first controller 270 determines whether the image data of the output image 500B is received (step T1). When the image data of the output image 500B is not received (step T1/NO), the first controller 270 waits until the image data of the output image 500B is received.

When receiving the image data of the output image 500B (step T1/YES), the first controller 270 determines whether the source information is received (step T2). When the source information is not received (step T2/NO), the first controller 270 controls the image processor 240 to process the image data of the output image 500B. When the image I/F 210 is not contained in the sources set in the source setting window 400, the control device 300 does not transmit the source information to the projector 200. That is, since the APP image generated by the APP 350 of the control device 300 is displayed, the source information is not transmitted to the projector 200.

The image processor 240 loads the received image data in the frame memory 245, and performs, for example, image processing such as adjustment of color tone or luminance on the loaded image. Subsequently, the image processor 240 outputs image information as information of the image loaded in the frame memory 245 to the image projector 250. The image projector 250 generates an image light corresponding to the image information (step T8), and projects the generated image light on the projection surface 30 by the projection lens 255 (step T9). Thereby, the output image 500B is displayed as the display image 500C on the projection surface 30.

When the source information is received (step T2/YES), the first controller 270 determines whether the input I/F indicated by the source information receives image data (step T3). When the input I/F does not receive the image data (step T3/NO), the first controller 270 waits until the input I/F receives the image data.

When the input I/F indicated by the source information receives the image data (step T3/YES), the first controller 270 detects a black image area of the area of the output image 500B (step T4).

Then, the first controller 270 determines whether the resolution of the detected black image area is the same as the resolution of the image data (step T5).

When the resolution of the detected black image area is different from the resolution of the image data (step T5/NO), the first controller 270 controls the image processor 240 to execute the resolution conversion processing of matching the resolution of the image data with the resolution of the black image area (step T6).

When the resolution of the detected black image area is the same as the resolution of the image data (step T5/YES), the image processor 240 superimposes the image data on the black image area of the output image 500B to generate the display image 500C (step T7). Then, the image processor 240 outputs image information based on the image data loaded in the frame memory 245 to the image projector 250. The image projector 250 generates an image light corresponding to the image information (step T8), and projects the generated image light on the projection surface 30 by the projection lens 255 (step T9). Thereby, the display image 500C is displayed on the projection surface 30.

5. Other Embodiments

The above described embodiments are preferred embodiments. The present disclosure is not limited to the above described embodiments, but various modifications can be made without departing from the scope of the present disclosure.

For example, the projector 200 may transmit information indicating whether image data is received from the image supply device 100 through the first HDMI I/F 211 to the projector 200 through the first USB I/F 221.

When the projector 200 does not receive the image data from the image supply device 100 based on the information received from the projector 200, the control apparatus 300 does not transmit the output image 500B containing the black third window 650 and the source information to the projector 200.

Further, when the control device 300 is configured to transmit the output information containing the adjustment image 500A, the window information, and the source information to the projector 200, the control device does not transmit the window information and the source information to the projector 200.

For example, in the above described embodiment, the case where the light modulation device includes the three transmissive liquid crystal panels 253 (R), 253 (G), and 253 (B) is described, however, the embodiment of the present disclosure is not limited thereto. The light modulation device may be a reflective liquid crystal panel or a digital micromirror device.

The respective functional units shown in FIGS. 1 and 2 show functional configurations and specific implementation configurations are not particularly limited. That is, hardware individually corresponding to the respective functional units are not necessarily implemented and, obviously, a single processor may execute a program to implement the functions of the plurality of functional units. Further, part of the functions implemented by software in the above described embodiment may be implemented by hardware or part of the functions implemented by hardware may be implemented by software.

When the control method for a display system is implemented using computers provided in the control device 300 and the projector 200, programs to be executed by the computers may be configured in a form of a recording medium or a transmission medium for transmitting the programs. As the recording medium, a magnetic or optical recording medium, or a semiconductor memory device can be used. Specifically, a portable recording medium such as a flexible disc, an HDD (hard disk drive), a CD-ROM, a DVD, a Blu-ray disc, a magneto-optical disc, a flash memory or a card-type recording medium, or a fixed recording medium may be employed. The recording medium may be a nonvolatile memory device including a RAM, a ROM, and an HDD as an internal memory device provided in a server apparatus.

6. Summary of Present Disclosure

The summary of the present disclosure will be appended as below.

Appendix 1

A control method for a display system includes transmitting output information containing an output image in which a first image is placed and position information indicating a position of the output image in which a second image is to be placed to a display device by a control device, transmitting the second image to the display device by an image supply device, generating a display image by placing the second image in the output image based on the position information by the display device, and displaying the display image by the display device.

Accordingly, the display device generates the display image by placement of the second image in the output image based on the position information received from the control device, and the generated display image is displayed by the display device. Thereby, the display image in which the second image is placed according to the first image and the position information may be generated by the display device and the generated display image may be displayed. Therefore, a display image in which a plurality of images are arranged can be displayed by the display device without increase of processing power of the display device.

Appendix 2

In the control method for a display system according to Appendix 1, the position information is information indicating an area in a preset color of the output image, and generating the display image by the display device includes detecting the area in the preset color from the output image, and placing the second image in the area.

Accordingly, the area of the output image in which the second image is to be placed is formed in the preset color, and thereby, the display device may generate the display image by detecting the preset color area from the output image and placing the second image in the detected area of the output image. Therefore, the effort to separately generate position information may be saved.

Appendix 3

In the control method for a display system according to Appendix 1, the position information is information indicating a position and a size in the output image.

Accordingly, the display device can generate the display image by placing the second image in the output image based on the position and the size indicated by the position information.

Appendix 4

In the control method for a display system according to any one of Appendices 1 to 3, the first image is an image generated by the control device executing an application program.

Accordingly, the image generated by execution of the application program is contained in the display image as the first image. Therefore, the image generated by execution of the application program can be displayed.

Appendix 5

The control method for a display system according to any one of Appendices 1 to 3, further includes, by the control device, accepting an operation to designate the position of the output image in which the second image is placed, and generating the position information based on the accepted operation.

Accordingly, the operation to designate the position of the output image is performed, and thereby, the second image can be placed in the position of the output image designated by the operation. Therefore, the second image can be placed in the position of the output image designated by the user.

Appendix 6

In the control method for a display system according to any one of Appendices 1 to 3, the display device and the control device are coupled via a first interface, transmitting the output information to the display device by the control device is transmitting the output information to the display device via the first interface by the control device, the display device and the image supply device are coupled via a second interface different from the first interface, and transmitting the second image to the display device by the image supply device is transmitting the second image to the display device via the second interface by the image supply device.

Accordingly, the output information is transmitted from the control device to the display device via the first interface, and the second image is transmitted from the image supply device to the display device via the second interface. Therefore, a delay of transmission of the output information and the second image to the display device may be reduced.

Appendix 7

In the control method for a display system according to any one of Appendices 1 to 3, information indicating whether the display device receives the second image from the image supply device is transmitted to the control device, and when the display device does not receive the second image from the image supply device, the control device transmits the output information not containing the position information to the display device.

Accordingly, when the display device does not receive the second image from the image supply device, the control device transmits the output information not containing the position information to the display device. Therefore, transmission of unnecessary information not used in the display device can be prevented.

Appendix 8

A display device includes a first interface coupled to a control device, a second interface coupled to an image supply device, an optical device, and at least one processor, wherein the at least one processor executes receiving output information containing an output image in which a first image is placed and position information indicating a position of the output image in which a second image is to be placed via the first interface, receiving the second image via the second interface, generating a display image by placing the second image in the output image based on the position information, and displaying the display image using the optical device.

According to the configuration, the display image is generated by placement of the second image in the output image according to the position information received via the first interface, and the generated display image is displayed. Thereby, the display image in which the second image is placed according to the first image and the position information may be generated by the display device and the generated display image can be displayed. Therefore, a display image in which a plurality of images are arranged can be displayed by the display device without increase of processing power of the display device.

Appendix 9

A control device includes at least one processor, wherein the at least one processor executes generating output information containing an output image in which a first image is placed and position information indicating a position of the output image in which a second image is to be placed, and transmitting the output information to a display device.

According to the configuration, the output information containing the output image in which the first image is placed and the position information indicating the position of the output image in which the second image is to be placed is transmitted to the display device. Therefore, in the display device, the display image can be generated by placement of the second image in the position of the output image indicated by the position information, and the generated display image can be displayed.

What is claimed is:

1. A control method for a display system, comprising:
- generating a first image by a control device;
- transmitting output information containing an output image in which the first image is placed and position information indicating a position of the output image in which a second image is to be placed, to a display device by the control device;
- transmitting the second image to the display device by an image supply device;
- generating a display image by placing the second image in the output image based on the position information by the display device; and
- displaying the display image by the display device,
- wherein the first image includes a plurality of image data arranged in a region different from a region in which the second image is to be placed, and wherein the plurality of image data includes at least one image data acquired by an application program stored in the control device.

2. The control method for a display system according to claim 1, wherein the position information is information indicating an area in a preset color of the output image, and generating the display image by the display device includes:

detecting the area in the preset color from the output image; and placing the second image in the area.

3. The control method for a display system according to claim 1, wherein the position information is information indicating a position and a size in the output image.

4. The control method for a display system according to claim 1, further comprising:

by the control device, accepting an operation to designate the position of the output image in which the second image is placed; and generating the position information based on the accepted operation.

5. The control method for a display system according to claim 1, wherein the display device and the control device are coupled via a first interface, transmitting the output information to the display device by the control device is transmitting the output information to the display device via the first interface by the control device, the display device and the image supply device are coupled via a second interface different from the first interface, and transmitting the second image to the display device by the image supply device is transmitting the second image to the display device via the second interface by the image supply device.

6. The control method for a display system according to claim 1, wherein information indicating whether the display device receives the second image from the image supply device is transmitted to the control device, and when the display device does not receive the second image from the image supply device, the control device transmits the output information not containing the position information to the display device.

7. The control method for a display system according to claim 1, wherein in generating the first image, the control device generates a composite image of the plurality of image data and arranges the composite image in a first region such that the plurality of image data are arranged in a divided manner in the first region, and the first region is different from a second region in which the second image is to be placed by the displace device.

8. A display device comprising:

a first interface coupled to a control device;

a second interface coupled to an image supply device;

an optical device; and at least one processor, wherein the at least one processor executes receiving output information containing an output image in which a first image is placed and position information indicating a position of the output image in which a second image is to be placed via the first interface, receiving the second image via the second interface, generating a display image by placing the second image in the output image based on the position information, and displaying the display image using the optical device, wherein the first image generated by the control device includes a plurality of image data arranged in a region different from a region in which the second image is to be placed, and wherein the plurality of image data includes at least one image data acquired by an application program stored in the control device.

* * * * *